(12) United States Patent
Søgaard (10) Patent No.: US 6,537,492 B1
(45) Date of Patent: Mar. 25, 2003

(54) METHOD AND AN APPARATUS FOR SURFACE STERILIZING ITEMS AND A SYSTEM SUITABLE FOR STERILIZING BOTTLES

(75) Inventor: Søren Peter Søgaard, Halk (DK)

(73) Assignee: Diffclean A/S (DK)

(*) Notice: Subject to any disclaimer, the term of this patent is extended or adjusted under 35 U.S.C. 154(b) by 0 days.

(21) Appl. No.: 09/117,897

(22) PCT Filed: Feb. 10, 1997

(86) PCT No.: PCT/DK97/00056
§ 371 (c)(1),
(2), (4) Date: Sep. 16, 1998

(87) PCT Pub. No.: WO97/29016
PCT Pub. Date: Aug. 14, 1997

(30) Foreign Application Priority Data

Feb. 9, 1996 (DK) .................................... 0131/96

(51) Int. Cl.⁷ .................................................. A61L 2/12
(52) U.S. Cl. ............................ 422/21; 422/20; 422/307
(58) Field of Search ................... 422/20, 21, 186, 422/186.09, 186.3, 292, 300, 301, 302, 303, 304, 307, 308

(56) References Cited

U.S. PATENT DOCUMENTS

| 3,494,724 A | * | 2/1970 | Gray | 422/21 |
| 3,674,422 A |  | 7/1972 | Gray | 21/102 |
| 3,837,805 A | * | 9/1974 | Boucher | 422/301 |
| 4,296,068 A | * | 10/1981 | Hoshino | 422/304 |
| 4,680,163 A |  | 7/1987 | Blidschun et al. | 422/28 |
| 4,999,925 A | * | 3/1991 | Knabenhans et al. | 34/1 |

FOREIGN PATENT DOCUMENTS

| DE | 3414268 A1 | 10/1985 |
| DE | 4018142 A1 | 12/1991 |
| DK | 2354/89 | 5/1989 |
| SE | 462281 | 5/1990 |
| SE | 465512 | 9/1991 |

* cited by examiner

*Primary Examiner*—Elizabeth McKane
(74) *Attorney, Agent, or Firm*—Ostrolenk, Faber, Gerb & Soffen, LLP (57) ABSTRACT

The surface of items which are penetratable for high-frequency energy, like for instance plastic food packagings which are manufactured by blow molding or vacuum molding, and in particular returnable bottles for soft drinks, are sterilized by providing a liquid film on the items, following which they are subjected to microwaves or high-frequency to heat the liquid film, preferably to the boiling point. The liquid is preferably water with a de-tensioning agent. An apparatus for performing the method is provided with wetting means, dripping off means adapted to leave a liquid film on the items during the dripping off, and heating means. The dripping off means are substantially constituted by transport means for conveying the items from the wetting means to the heating means. A system for sterilizing plastic bottles may compromise a washing section, a rinsing section, transport means adapted to let the bottles drip off during transport, and a heating section.

28 Claims, 3 Drawing Sheets

METHOD AND AN APPARATUS FOR SURFACE STERILIZING ITEMS AND A SYSTEM SUITABLE FOR STERILIZING BOTTLES

BACKGROUND OF THE INVENTION

The present invention relates to a method and an apparatus for surface sterilising items and a plant suitable for sterilising bottles.

From DE patent publication No. 40 18 142 a method is known for filling containers such as bottles, where microwaves are applies to the containers before filling for sterilising the containers. Humidity present on the surfaces of the containers evaporates, and the heat developed by the vapour kills undesired microorganisms on the surfaces. Before or during the treatment with microwaves, water may additionally be applied to or injected into the containers; thereby vapour is created due to the treatment with microwaves, said vapour killing the microorganisms. The development of steam is stated to take place in the course of a few seconds.

From the correspondence relating to the prosecution of Danish Patent Application No. 2354/89 a microwave packaging sterilising system for washing and sterilising plastic packagings is known, in particular for returnable bottles of polymeric plastic. In this system a washing of the packaging takes place at a temperature not exceeding 35–40° C. to prevent shrinking of the packaging. To obtain, with certainty, a visual cleanness of the packagings at this low temperature, ultrasound is used, making it possible to avoid addition of lye to the washing water.

The washed packaging is not sterile after washing at such a low temperature, and therefore a sterilising using microwaves is carried out after the washing.

It is stated in the correspondence as a fact that the packaging would be heated to a temperature above deformation temperature if it was subjected to microwaves in a wet condition. This is explained by the fact that high amounts of energy would be transferred to the remaining moisture in and on the packaging. To prevent the application of microwave from heating the plastic material above the deformation temperature, it is therefore stated in the correspondence that during the sterilising treatment with microwaves an exact control of the microwave energy should be exerted as well as a removal of moisture from the packaging by means of a drying and cooling flow of sterile air.

It is, however, not described in the correspondence how this control of the microwave energy is to be carried out. It is only stated that the packaging can endure big amounts of microwave energy when it is dried, as it has a crystalline crystal lattice structure and consequently is not influenced by the microwave energy which exclusively kills bacteria and spores because they are "organic".

There is no detailed description in the correspondence of how the system is to be operated or worked in order not to heat the packaging in an inappropriate way and to in fact kill the microorganisms effectively, and it seems doubtful if a full sterilisation would be obtainable at all by following the instructions given in the correspondence.

Further, Swedish patent publication No. 462.281 discloses a method and an apparatus for sterilising empty packaging containers by application of steam under pressure, preferably at a temperature of 120–140° C., and preferably by additional use of hydrogen peroxide. Then microwaves are applied to the containers, which makes the temperature rise to around 145° C.

From Swedish patent publication No. 465.512 a method is known for sterilising a width of packaging material by spraying on a sterilising liquid such as hydrogen peroxide solution, which is then removed from the width of material by applying infrared light, microwaves, high-frequency energy or hot air.

Finally, German patent publication No. 34 14 268 discloses a method and an apparatus for killing germs in food containers, like for instance cups for dairy products, by applying hydrogen peroxide to the containers, the peroxide being atomized by means of ultrasound at a frequency above 1 MHz. At the end of the process the containers are subjected to a thermal treatment by means of hot air or microwave.

None of the methods described in these three publications may be used for sterilising heat sensitive items.

DESCRIPTION OF THE INVENTION

The object of the invention is to provide an effective surface sterilising of items which are penetrable by high-frequency electric energy, in particular items which do not withstand heat exceeding a certain limit. It is part of the object that a definite part of the surface of the item is to be sterilised. This part will often be the whole surface of the item, but if the item for instance is a container, the surface in question may be the whole interior surface of the item.

Important examples of said items are plastic containers which have been shaped by blow moulding or vacuum moulding in hot condition, for instance the commonly used returnable bottles for soft drinks made from PET (polyethylene terephthalate) or the likewise commonly used flat trays of vacuum-shaped PE (polyethylene) film, PS (polystyrene) film or the like for packing for instance meat products in self-service stores. Such containers often possess a so-called elastic memory or "residual activity", by which is to be understood the phenomenon that the item may "remember" a shape and a size, which it had at an earlier stage of manufacture, and that it often is liable to return to this shape when heated.

Moreover, the items may for instance comprise containers for packing preserves or semipreserves (for instance translucent containers with screw lids for marmalade, herrings, etc.) or for packing non-preserved technical products like unpreserved plastic paint.

Said soft drink bottles are case as a so-called preform, i.e. a bottle in which the mouth area with thread etc. has its final size and shape, but in which the container part is quite small and thick-walled. These preforms take up very little room and may therefore at a low cost be transported from a central place of manufacture to various finishing places, often in other countries, where they are blown up in a hot condition for the container part to take up the desired shape and size. The container part may then be given a desired, individual shape according to the wish of the soft drink producer without the need for using different preforms.

It has turned out that these soft drink bottles tend to shrink on account of said elastic memory, already at temperatures slightly above 40° C. Therefore, known washing and sterilising processes are not suitable for cleaning such bottles, as the bottles are liable to shrink at the temperatures used in these known processes, typically around 60° C. or above. Such shrinking is obviously undesirable, and a major part of the bottles have to be discarded after having been cleaned a few times using the known processes.

At the same time there is a considerable need for an effective cleaning and sterilising of such bottles, as partly the owners (the soft drink producing factories) want them to be refilled with differing products without any preceding sorting, which, as evidenced by experience, may give a distaste from the previously contained product, and partly the users after emptying the bottles notoriously use them for the most differing purposes, like for instance storing of petrol or diesel oil, or refilling with different strongly tasting beverages, like a Danish fashion drink "små grå" ("Small Gray Ones"; liquorice-and-ammonium-chloride-drops dissolved in vodka).

To meet the above object the present invention discloses a method, an apparatus and a plant.

The desired sterilising is obtained by heating a liquid film, and the heating is carried out by subjecting the item to high-frequency electric energy.

Experiments have shown that it is extremely important that the liquid to be heated by the high-frequency electric energy is actually present on the item in the form of a liquid film. Only in this way is the generation of a sterilising amount of heat ensured over the entire desired surface, without the heat development becoming so intense that an undesirable heating of the item itself takes place.

By providing the liquid film it is thus ensured that a substantial heating of the micro-climate on the surface of the item actually takes place. Besides, a total drying of microorganisms and germs on the item is avoided, whereby is ensured that they are optimally sensitive to high-frequency electric energy. Finally, the risk of sporogenous microorganisms creating spores is reduced, which will normally happen if these organisms are dried out.

Due to the fact that the liquid is present on the item just in the shape of a film, it is, as mentioned above, ensured that the amount of liquid is so small that during heating it cannot transfer sufficient heat to the item to heat the latter significantly.

By the liquid film established on the item being continuous, a sterilising is ensured of the surface of the entire item, or of a corresponding, definite part of the surface in its entirety, respectively.

According to the invention, the formation of the substantially continuous liquid film is ensured by using a liquid which is not repelled by the material of the item. Particularly for uses relating to food, water is preferred, which is, however, repelled by far by most polymeric materials. According to the invention, in this case a de-tensioning agent may be added. This also gives the additional advantage that the thickness of the liquid film to a certain extent may be controlled by controlling the type and the concentration of the de-tensioning agent. As de-tensioning agent may be used salts like for instance soda, organic solvents like for instance ethanol or surface-active agents. In particular surface-active agents are preferred, particularly the non-ionic type, as these may be used in lower concentrations and do not occasion substantial formation of foam. By the measures mentioned it is obtained that the liquid film is established in a particularly simple way.

The method according to the invention may advantageously be used for packagings, including returnable bottles and packaging trays for food. This is due to the fact being that the method according to the invention makes it possible to avoid using washing and sterilising chemicals, which is firstly undesirable in connection with packagings for foods and secondly considerably less detrimental to the environment.

By heating to the boiling point a particularly effective and quick sterilising is obtained.

By high frequency energy after boiling is obtained the effect that any water-containing microorganisms which may be left after the removal of the liquid film, are killed.

By removing excess energy is obtained the effect that an appropriate loading of the microwave source, normally a magnetron, is taking place, even though the items with the liquid film present do not constitute any noticeable load.

By using certain frequencies mentioned a comparatively high electric power may be used, as in most countries particularly easy rules apply for the use of these frequencies. A particularly simple tool is obtained for transferring high-frequency energy to the items.

The same liquid which has been used for washing or rinsing the item may be used for the formation of the liquid film.

By using ultrasound a particularly effective washing is obtained, which is a prerequisite for the adherence of the liquid film and for impurities not being present on the item, which impurities would be able to break the liquid film.

By designing the apparatus with dripping off means in the form of transport means, required transport means are utilised also as dripping off means. It is furthermore obtained that in a simple and safe way a substantially continuous liquid film is left on the items without any risk of the film drying out.

By blowing across the surface blowing off of liquid is ensured which may have accumulated in cavities on the item and/or a desired smoothing of the liquid film and/or a desired cooling of the item prior to the treatment with high-frequency energy.

By constructing a plant as described, the rinsing liquid used in the rinsing section may be used straight away for the formation of the liquid film for use in sterilising, whereby this liquid serves a double purpose. Thereby, a most compact system is obtained together with a washing and sterilising process, which is optimally gentle towards the bottles in respect of temperature stress on the material of the bottles. This system is suitable for sterilising both returnable bottles and throwaway bottles.

By providing a washing section the sterilising may be carried out immediately following washing of the bottles. When ultrasound is employed, the washing may be carried out with a minimum use of lye for quite without lye and thus as little detrimental to the environment as possible. Such a washing will first of all be necessary when the system is being used for returnable bottles.

BRIEF DESCRIPTION OF THE DRAWINGS

The invention will now be explained in the following by means of examples and with reference to the drawing. The invention will be explained with reference to washing and sterilsing of plastic bottles, but the invention may be used for any other suitable items.

DESCRIPTION OF THE DRAWINGS

Figure 1:
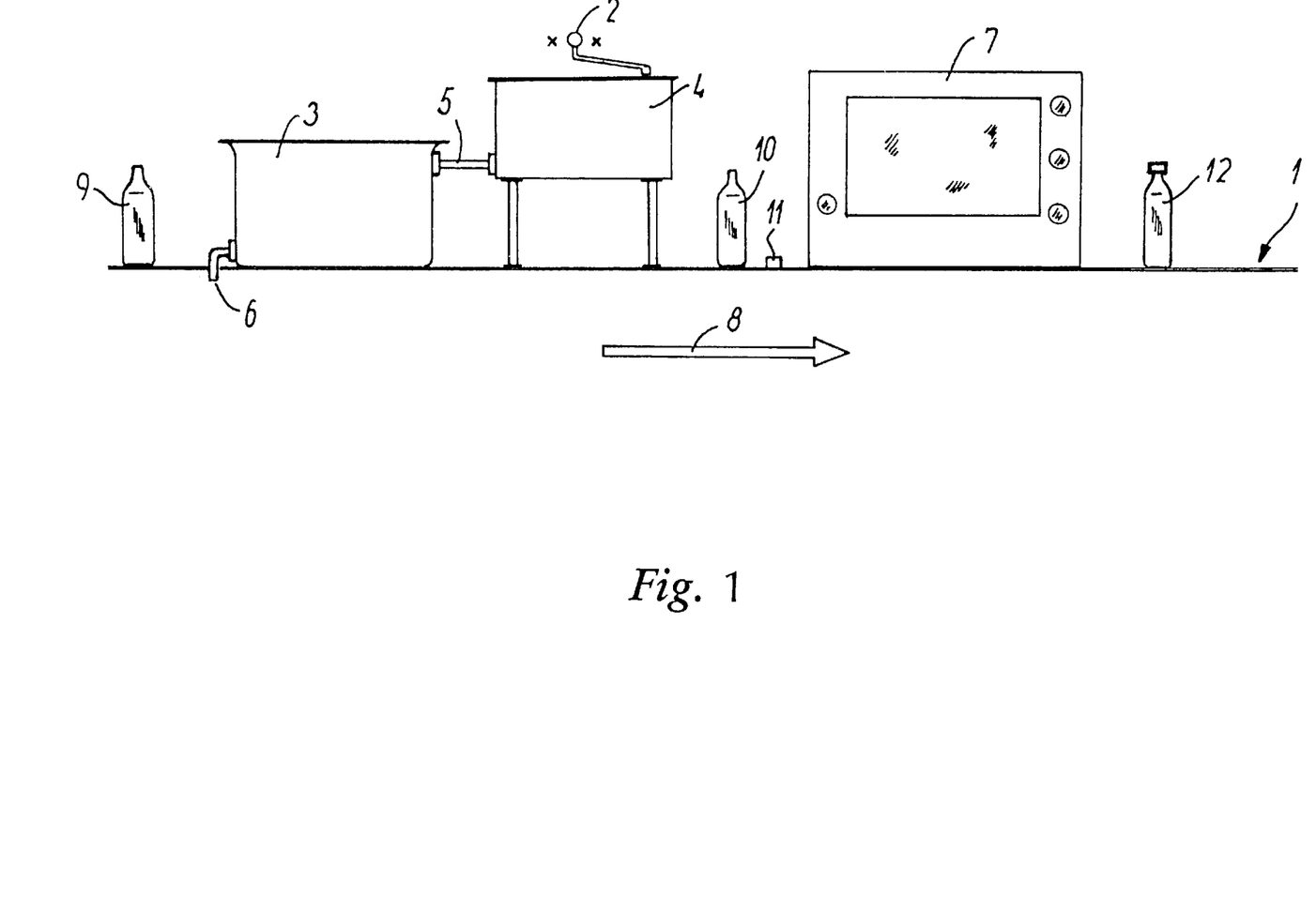
FIG. 1 schematically shows an experimental arrangement for carrying out the method according to the invention.

FIG. 1 shows an experimental arrangement for carrying out the method according to the invention. On a laboratory table 1 with a sink (not shown) and a tap 2, two vessels 3, 4 are mounted, each having a volume of 41 l. The vessel 4 has an output 5 to the vessel 3. The vessel 3 is through a tube 6 connected with an output not shown. The vessels are of the brand SONOREX® type R, vessels provided with two ultrasound transducers (not shown) of each 1,000 W, driven from ultrasound generators at a frequency of 35 kHz built into the vessels and by means of which the water of the vessels 3, 4 may be brought into corresponding oscillation.

On the table 1 is further a microwave oven 7. The oven 7 has been made by modifying a microwave oven of the make VOSS, type 1.12, model MOA263-1. The grill element was removed and an extran (not shown) guide vane for the microwaves was inserted for obtaining a better distribution of the microwave energy over the volume of the oven. Moreover, the controlling of the magnetron was amended so that it could work continuously (not pulsating) for up to 5 minutes. Instead of a microwave oven a high-frequency heating system might be mused, for instance of the type described in Danish patent No. 169.902.

The bottles are generally moved in the travelling direction 8, unclean bottles being supplied from the left in FIG. 1. The bottles 9 are placed in the vessel 3 and washed in water which has flown over from vessel 4 through the outlet 5, and under treatment with ultrasound. After this washing they are moved to the vessel 4, where a rinsing is done in water, to which only de-tensioning agent has been added, and likewise under treatment with ultrasound.

After washing and rinsing the bottles 10 are covered by a quite thin, evenly distributed water film on the exterior and interior surfaces. The washing done has removed impurities which might break the water film, and the de-tensioning agent ensures that the water film adheres to the bottles even though they have been produced from a water-repellent type of plastic. The bottles are dripped off under simultaneous turning to let all water drip off from their interior and exterior surfaces and are then controlled visually.

The controlled bottles 10 are with a corresponding number of caps 11 conveyed into the microwave oven 7 and treated with high-frequency electric energy. Adequate measures are taken to avoid damaging the water film. During the treatment the water film is boiled off, whereby the microorganisms present in the water film is killed. The treatment may be continued, as the microorganisms may have a certain sensitivity to high-frequency electric energy, even after complete or partial drying. Bottles and caps are removed from the microwave oven after the treatment, and the caps are put on. The bottles 12 with caps may now be taken to a bacteriological control.

Even though an actual trial arrangement has been descried, the person skilled in the art would realize that a system for cleaning and sterilising bottles or other types of packaging or other suitable items at a large scale might be built in the same way. The bottles 12 would then be delivered further for filling. They would have no caps on, but they might be temporarily protected against impurities in a similar way or for instance by means of a tent being filled with sterile air under a slight overpressure.

Figure 2:
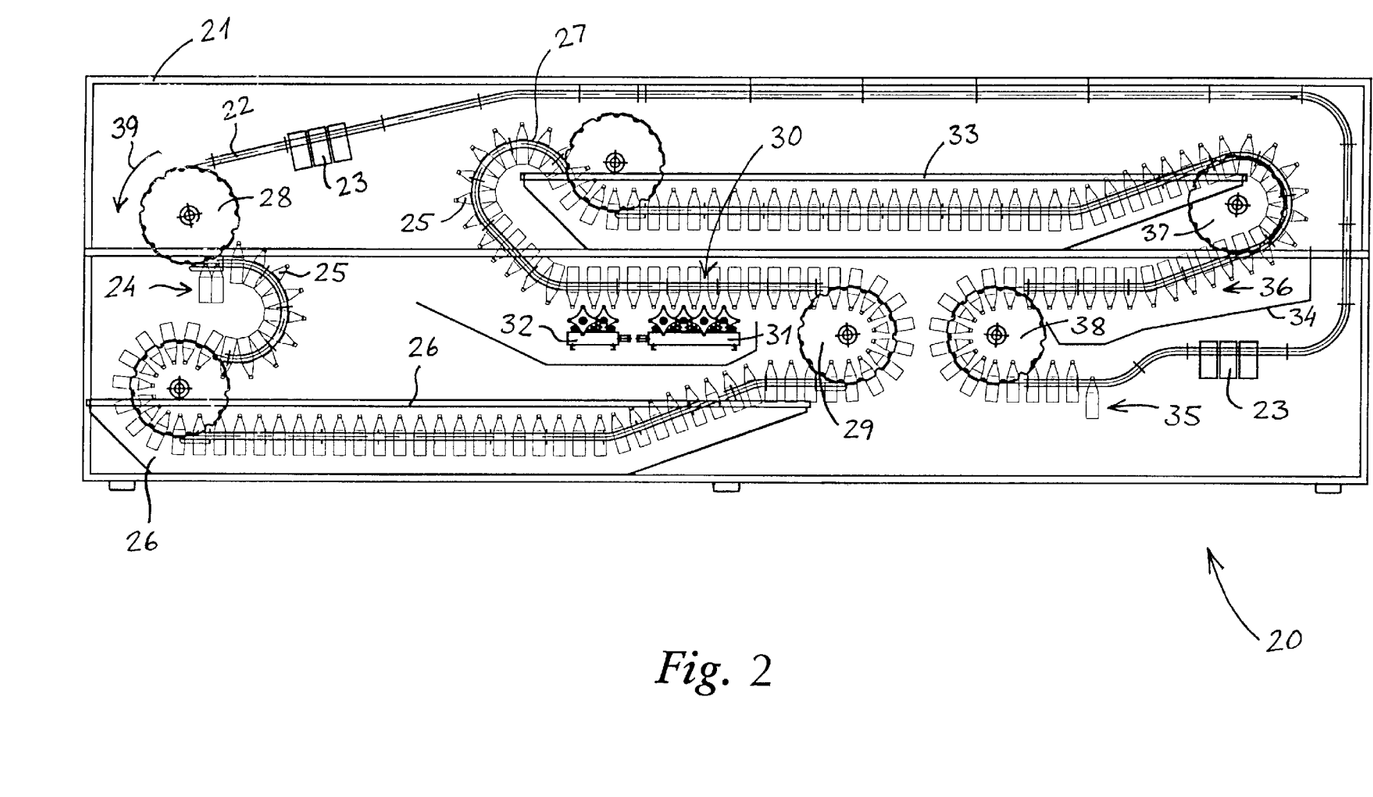
FIG. 2 schematically shows an elevation of a machine for washing, rinsing and wetting returnable bottles for soft drinks.
Figure 3:
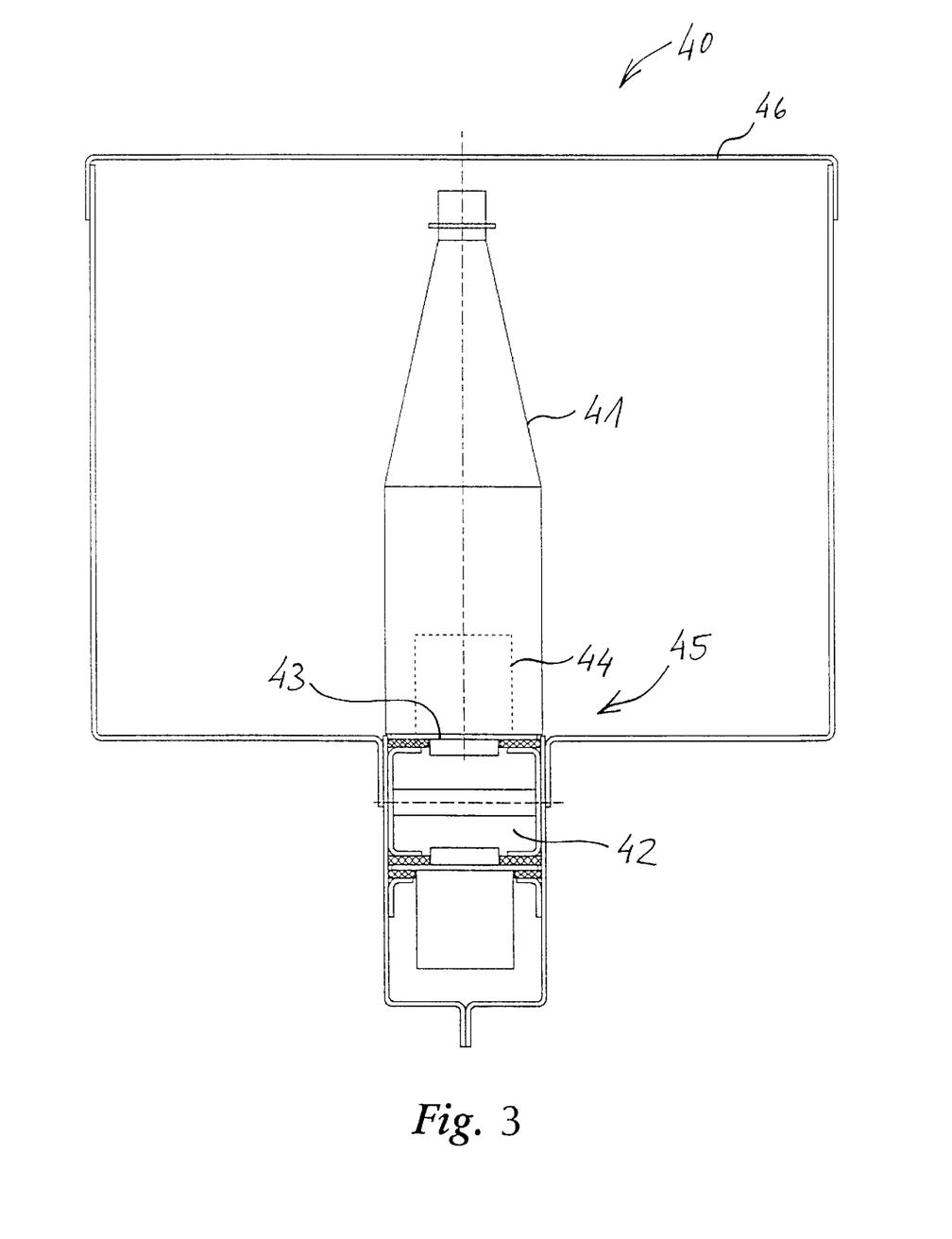
FIG. 3 shows a sectional view of a run-through microwave oven for sterilising bottles which have been washed, rinsed and wetted by means of the machine according to FIG. 2.

Some of the sections of such a large scale system may according to the invention for instance be organized as shown schematically in FIGS. 2 and 3.

FIG. 2 is an elevated view of a washing, rinsing and wetting machine 20 for returnable bottles for soft drinks of the type generally available in the sizes ½ liter and 1½ liter. The machine consists of a frame 21 of square tubing and has an endless chain 22 transporting bottles in the machine in the direction 39. The chain 22 is in its whole length provided with bottle holders 23, but these have for the sake of clarity only been shown in a few places on the chain 22 in FIG. 2. The chain 22 is driven and operated by chain wheels 28, 29, 37, 38 and guided by guides 27.

In a starting station 24 (not shown in detail) non-sterile bottles fresh from factory and returned bottles 25 are inserted in the bottle holders 23 and are brought around with the chain 22. The chain 22 first passes through a washing vessel 26, through which the bottles 25 are brought, submerged and in an upright position, whereby they are completely filled with washing water. In the vessel 26 is water with a de-tensioning agent in the form of a surface-active agent of the type used in household dish-washing machines (see below). The water is subjected to ultrasound by means of submerged ultrasound transducers (not shown), which are preferably distributed over the whole length of the vessel. In the vessel 26 remnants of the previous contents of the bottles and labels, etc. are loosened and removed. In the machine 20 shown the residence time in the vessel 26 is between 100 and 200 seconds, preferably approx. 150 seconds.

Then the chain 22 is running around a chain wheel 29 and back through a section 30, in which the bottles are emptied of washing water and further flushed free of remnants of previous contents and labels at flushing stations 31, 32.

The chain 22 with the bottles 25 then passes through a rinsing vessel 33 of the same construction and mode of operation as the washing vessel 26. In the rinsing vessel 33 is water with de-tensioning agent added. The water is led from the rinsing vessel 33 to the washing vessel 26 and then away, in the same way as explained above in respect of FIG. 1.

After the rinsing the chain 22 is passed over a chain wheel 37, where it turns, so that the bottles are emptied and dripped off 36. The water dripping off is collected in a tray 34. In the machine shown the speed of the chain is 2½ m/min (42 mm/s), the speed being continuously variable in the interval approx. 1.7–3.3 m/min, and the distances around the rinsing vessel and the dripping off tray 34 are so adapted that the bottles after having left the rising vessel are emptied in the course of 108 seconds and then dripping off in the course of further 40 seconds. In the course of the following 54 seconds the bottles are conveyed around a chain wheel 38 and turned right, following which they are removed at a removal station 35 (not shown in detail) and taken to a heating section. The total transporting time to the heating section after finishing of the dripping off is in the shown embodiment of the machine 20 approx. 120 seconds.

FIG. 3 is a schematic vertical section in a heating section 40 for a machine 20 like the one described above. The bottles 41 are here reloaded on a conveyor belt 45 in the form of a chain 42 with superjacent carrier members 43 and driving dogs 44, the bottles being conveyed in upright position on top of the conveyor belt 45. The bolt 45 runs through a box 46 constituting the over compartment of a microwave oven. Devices (not shown) are arranged for providing microwaves and a suitably even distribution of these in the oven compartment 46.

To ensure an advantageously even load of the microwave source, normally a magnetron, the oven compartment may according to the invention be provided with microwave-absorbing water compartments or the like to compensate for the insignificant loading of the source from the bottles 41 with the water film.

A plant according to the invention may also be built directly together with a plant for filling the bottles, and in a simple way a plant may be established in which the bottles may be kept sterile during filling, so that an aseptic filling is obtained.

When sterile air under a slight overpressure is used for creating a sterile protective atmosphere as mentioned, the supply of the sterile air may advantageously be carried out in such a way that on account of the admission movement of the air, for instance in form of a jet or a curtain, a blowing away of possible water residues on the items and a cooling of the items is obtained before the treatment with microwaves or high-frequency power.

EXAMPLE 1

Nine bottles of PET were filled with dairy products (see the following diagram) and left for 30 days at room temperature. They were then emptied and washed in water, to which a de-tensioning agent of the brand SUN PROGRESS had been added (a common type for use in dish-washing machines), with the use of ultrasound.

After the washing the bottles was dripped off. Then five of the bottles (marked 2–6) were treated in a microwave oven of the household type with pulsating power 750 W in 85 seconds. Two of the bottles (marked 7–8) were not treated by microwaves, whereas two of the bottles (9–10) were treated like the bottles marked 2–6, but then capped and finally given treatment for additional 30 seconds in the microwave oven.

The bottles thus cleaned, of which the bottles 2–6 and 9–10 also had been sterilised by the method according to the invention, were subjected to a germ counting test according to Koch's plate technique and the following germ counts were observed:

| Bottle No. | Contents | Germ Count |
| --- | --- | --- |
| 2 | Double Cream | 10 |
| 3 | Cocoa Milk | 30 |
| 4 | Yoghurt | 42 |
| 5 | Low-Fat Milk | 70 |
| 6 | Buttermilk | 2 |
| 7 | Double Cream | 7700 |
| 8 | Full-Cream Milk | 1200 |
| 9 | Milk contaminated w/ Urine | 2 |
| 10 | Milk contaminated w/ Earth | 4 |

EXAMPLE 2

With the arrangement according to FIG. 1, 150 returnable PET bottles for soft drinks were washed, the volumes being ½ and 1½ l. 100 of the bottles were selected at random among returned bottles and 50 were fresh from factory.

In the vessel 3 water from the outlet 5 from the vessel 4 was used and at a temperature not above 28° C.

The bottles were washed in the vessel 3 with the applying of ultrasound for 2 minutes for removal of residual contents, labels, label glue, etc.

In the vessel 4 was mains water, to which de-tensioning agent for household dish-washing machines had been added, the de-tensioning agent being of the brand Neophos® from Skandinavisk Denckiser A/S, 2800 Lyngby, Denmark containing 5–15% non-ionic tensides and preservative agent, in a concentration of 0.28% (1 dl per 35 l water). The water was exchanged for every 25 bottles and its temperature was kept below 25° C.

The bottles were rinsed in the vessel 4 under influence of ultrasound for 2 minutes. Caps fresh from factory for the bottles were washed in the vessel 4 for 20 seconds. After the washing the bottles were checked as to optical cleanliness with satisfactory result, and the bottles were dripped off, i.e. they were turned, until all liquid had run off and no drops or only very few fell from the bottles irrespective of their position.

Bottles and caps were sterilised for 30 seconds in the microwave oven 7, set at 750 W, in batches of 7 bottles+7 caps, following which the caps were put on.

During the treatment in the oven the water film disappeared from the bottles in less than 10 seconds. Only during the first 5–8 seconds was vapour or condensed drops observed on or in the bottles.

All handling was done manually in a non-sterile atmosphere in a test hall having a port leading to the open.

Finally, a germ counting test of all bottles was made in the following way: some sterile water was poured into each bottle, and after shaking, this water was brought out and germ count tested by Koch's plate technique using nutritive media suited for cultivation of bacteria relevant in connection with carbonised soft drinks (i.e. soft drinks to which carbonic acid has been added). In respect of all bottles germ counts of less than 50 were found, corresponding to the assessment "satisfactory".

EXAMPLE 3

2×25 mixed new and used returnable bottles of PET for soft drinks of a volume of ½ and 1½ liters, respectively, were washed and sterilised with use of the arrangement according to FIG. 1 and the method according to Example 2. The volume and height of the bottles were measured before washing and sterilising, and after 5, 10, 20 and 25 times of washing and sterilising.

The volume was measured by filling the bottle to the rim, and the height measured by means of a calliper gauge mounted on a surface plate.

The measuring results listed below were obtained, each one being average values for the bottles measured. The difference in the measurements of the volume is ascribed to measurement uncertainty of the measuring method used.

| Number of sterilis- ings | ½ litre bottles | | 1½ litre bottles | |
| --- | --- | --- | --- | --- |
|  | Volume ml | Height mm | Volume ml | Height mm |
| 0 × | 527.6 | 230.3 | 1575.1 | 334.2 |
| 5 × | 528.0 | 230.3 | 1576.2 | 334.2 |
| 10 × | 528.0 | 230.3 | 1576.2 | 334.2 |
| 20 × | 528.1 | 230.3 | 1576.1 | 334.2 |
| 25 × | 527.8 | 230.3 | 1576.1 | 334.2 |

EXAMPLE 4

16 returnable bottles of PET for soft drinks were washed and sterilised using the arrangement according to FIG. 1 and the method according to Example 2.

Then the bottles were filled with the products and undesired liquids, respectively, mentioned in the diagram below, and were left for the periods stated in the diagram.

After standing the bottles were washed again and sterilised under use of the arrangement according to FIG. 1 and the method according to Example 2, and then refilled with plain soda-water.

A trial tasting gave the ratings 1–3 stated in the diagram below and having the meanings:

1: satisfactory

2: not quite satisfactory (after-taste)

3: not satisfactory (after-taste).

The first-mentioned product in the diagram, "smä grä" has been described in the introductory part of the present description. The two last products mentioned in the diagram are examples of the previously mentioned, undesirable liquids. The remaining products are different soft drinks, the major part of these being carbonized.

Out of 16 bottles four were considered satisfactory (1), four not quite satisfactory (2) and eight not satisfactory (3).

These ratings were alleged to be better than the ones obtained with the traditional cleaning methods.

| Product | \multicolumn{7}{c}{Standing Period} | | | | | | |
|---|---|---|---|---|---|---|---|
| | 15 min. | 1 week | 10 day | 2½ mth. | 4½–6 mth. | 10–17 mth. | un-known |
| "Smä grä" | 2 | 2 | 3 | 3 | | | |
| Grape Apollinaris | | | | | | 3 | |
| Bitter Grape lemonade | | | | | | 3 | |
| Bitter Lemon lemonade | | | | | | 3 | |
| Dry Lemon lemonade | | | | | 1 | | |
| Orange lemonade | | | | | | 2 | |
| Orange Juice | | | | 3 | | | |
| Light Orange lemonade | | | | | | 1 | |
| Cola | | | | | | 1 | |
| Light Cola | | | | | | 1 | |
| Apple Drink | | | | | | | 3 |
| Motor Oil | 3 | | | | | | |
| Petrol | 2 | | | | | | |

EXAMPLE 5

In a test corresponding to the test according to Example 4 the following results were obtained, with similar meanings as in Example 4.

| Product | No. of treatments | Standing, months | Taste rating | Distaste |
|---|---|---|---|---|
| Bitter Grape lemonade | 2 | 10 | 3 | heavy orange |
| Bitter Lemon lemonade | 2 | 10 | 2 | fruity |
| Grape Apollinaris | 2 | 10 | 3 | heavy citrus |
| Orange Juice | 2 | 5 | 2 | distinct orange |
| Pineapple Drink | 1 | 2½ | 2 | distinct pineapple |
| Apple Syrup | 1 | 2½ | 1 | |
| Apple Juice | 1 | 2½ | 1 | |
| Apple Must | 2 | 18 | 2 | distinct plastic |
| Ice Tea | 1 | 1 | 1 | |
| Cocoa Milk | 1 | 2½ | 1 | |
| "Smä grä" | 1 | 3 | 3 | heavy liquorice |
| "Smä grä" | 2 | 3 | 3 | heavy liquorice |
| "Smä grä" | 2 | 6 | 3 | heavy liquorice |
| Motor Oil | 1 | 2½ | 1 | |
| Diesel Oil | 1 | 2½ | 3 | heavily unclean |
| Petrol | 1 | 2½ | 3 | heavy petrol |
| Anti-Freeze | 1 | 2½ | 3 | heavy plastic, greasy |

In the cases where the bottles are stated to have been washed twice (column 2 of the diagram) the result of the trial tasting has been "not satisfactory" after the first washing and refilling with plain soda-water. These bottles are then washed a second time and once more refilled with plain soda-water and trial-tasted.

As a whole the result of this test is considered to correspond to what can be obtained by the traditional cleaning methods.

EXAMPLE 6

Two PET returnable soft drink bottles fresh from factory and three used ones (recycled) with a volume of 1½ l were washed and sterilised under use of the arrangement according to FIG. 1 and the method according to Example 2. However, no de-tensioning agent was added to the either in the washing vessel 3 or the rinsing vessel 4.

A visual control after washing, rinsing and dripping off showed that water adhered to the interior surfaces of the bottles as a broken film, i.e. there were scattered dry areas of varying size, in between areas covered by water film in which the water had gathered into drops and elongated "strips".

After sterilising as in Example 2 the bottles were split open, and to the inner surface of the cylindrical part of the bottle wall a nutritive agent suited for water bacteria and in the form of a jelly was applied. After standing for 24 hours growth of bacteria colonies was demonstrated, the germ counts being 2–3,000, in scattered areas of size and form like the previously observed dry areas of the interior wall of the bottle.

This test result clearly indicates that it is of vital importance for an effective sterilising at the low temperatures used here, that the liquid is present on the item as an unbroken liquid film.

As will be seen from the examples, the invention makes it possible to wash items such as plastic bottles at a rather low temperature with satisfactory results, as due to the effective sterilising, a better cleaning is obtained in total than by using traditional cleaning methods.

Hereby the possibility is obtained to clean heat-sensitive plastic packagings, like for instance returnable bottles of PET for soft drinks, considerably many more times than is possible with the cleaning methods used today.

In this way the bottles may be recycled more times than is possible today, where they have to be discarded on account of shrinking long before they are worn out.

Moreover, the invention makes it possible to wash said items in water without addition of lye, or at least with a quite low concentration of lye. Addition of for instance soda lye to the washing water gives environmental problems, and moreover presents a particular problem at the washing of returnable bottles of PET for soft drinks. The stress, to which these bottles are exposed during use, causes the formation of many very small cracks in the plastic material, and sodium hydroxide is deposited in the cracks, which gives the material an undesirable grey appearance.

The cleaning methods used today necessitate the use of washing water at a temperature of 58–62° C. and adding of soda lye to a NaOH concentration of 3–7%. By way of comparison it may be added that returnable bottles of glass for soft drinks are washed in water with a temperature of 92° C. and soda lye being added to a NaOH concentration of 16%.

Concluding, the invention offers, in addition to what has already been stated, two very important advantages in comparison with the traditional cleaning methods for the same purpose, viz. a considerable saving of energy and a considerably reduced environmental detriment.

The saving of energy is obtained due to far less energy being used for the operation of the ultrasound generators and the heating means such as the microwave oven, than being saved by only having to heat the washing water to 25–28° C.

The substantially reduced environmental detriment is obtained due to addition being avoided of environmentally detrimental substances, like soda lay, to the washing water. Finally, the effective sterilising makes it possible to reduce use of preservative agents in the products contained in the bottles.

I claim:

1. A method of sterilizing the surface of a hot deformation formed item of polymeric material comprising providing on said surface a substantially continuous film of a liquid which is not repelled by the polymeric material and which comprises water, causing the liquid of the film which does not cling to said surface to be separated from the surface while leaving a substantially continuous film on said surface, and subjecting the item to high frequency electrical energy under conditions which heat the liquid film and sterilise the surface on which said film is present without substantially heating said surface.

2. A method according to claim 1, in which the item is a packaging.

3. A method according to claim 2, in which the packaging is a returnable blow moulded bottle for beverages.

4. A method according to claim 2, in which the packaging is a vacuum moulded tray or box for packing or storing of food.

5. A method according to claim 1, characterised in that the liquid film at least locally is heated to its boiling point.

6. A method according to claim 1, characterised in that the item is still subjected to high-frequency electric energy after the boiling or evaporating away of the liquid film.

7. A method according to claim 1, characterised in that the high-frequency electric energy is supplied in the form of microwaves.

8. A method according to claim 1, characterised in that the high-frequency electric energy is supplied at a frequency of 3–300 MHz.

9. A method according to claim 8 characterized in that the frequency is from 13.56 MHz to 40.68 MHz.

10. A method according to claim 9 characterized in that the frequency is 13.56, 27.12 or 40.68 MHz.

11. A method according to claim 1 in which said liquid is water containing a de-tensioning agent.

12. A method according to claim 11, characterized in that the de-tensioning agent is a non-ionic surfactant.

13. A method according to claim 1, characterised in that the sterilising is carried out immediately after a preceding washing or rinsing of the item, and in that the liquid film is left on the item after the washing or rinsing.

14. A method according to claim 13, characterised in that ultrasound is applied to the liquid used in the washing or rinsing process during such process.

15. A method according to claim 1 characterized in that the causing the liquid to be separated from the surface comprises turning the item.

16. A method according to claim 15 characterized in that the surface of the item comprises an interior surface of a container.

17. A method according to claim 16 characterized in that the turning of the item comprises rotating the item such that a surface being sterilized is changed from an upward orientation to a downward orientation.

18. An apparatus for surface sterilising a hot deformation formed item of polymeric material comprising a water wetting chamber, a dripping area, a heating chamber, a transporter arranged to convey items from the wetting chamber through the dripping area to the heating chamber and to turn the item such that all liquid water not forming a film clinging to the surface of the item readily drips therefrom, and a controller for the transporter arranged to regulate the transport time such that substantially all of the drippable liquid has separated from said item without removal of a substantially continuous liquid film from the surface of the item to be realized when the transporter delivers the item into the heating chamber, and wherein the heating chamber comprises a source of high frequency electrical energy.

19. An apparatus according to claim 18, characterized in that the dripping area contains an air blower.

20. An apparatus according to claim 18, characterized in that the wetting chamber is a washer or rinser.

21. An apparatus according to claim 20, characterized in that the wetting chamber comprises an ultrasound applicator.

22. An apparatus according to claim 18, characterized in that the heating chamber comprises a continuous flow microwave oven.

23. An apparatus according to claim 18, wherein the heating chamber comprises a pair of capacitor plates connected to an electric high frequency generator adapted to apply high frequency electrical voltage to said plates and wherein the transporter is disposed so as to convey items between the pair of capacitor plates.

24. An apparatus according to claim 18 characterized in that the transporter is arranged to turn the item such that a surface being sterilized is changed from an upward orientation to a downward orientation.

25. A plant for sterilizing the interior of hot deformation formed bottles of a polymeric material comprising a rinsing section adapted to rinse the interior of said bottles with water, a heating section to apply high frequency energy to the interior of the bottles, and a transporter arranged to convey the bottles from the rinsing section to the heating section and to turn such that all rinse liquid drips from the interior of the bottles without drying the bottles, wherein said plant has a washing section disposed upstream of the rinsing section.

26. A plant for sterilizing the interior of hot deformation formed bottled of a polymeric material comprising a rinsing section adapted to rinse the interior of said bottles with water, a heating section to apply high frequency energy to the interior of the bottles, and a transporter arranged to convey the bottles from the rinsing section to the heating section and to turn such that all rinse drips from the interior of the bottles without drying the bottles, wherein said plant has a packing section and a second transporter adapted to convey the bottles from the heating section to the packing section under aseptic conditions.

27. A plant for sterilizing the interior of hot deformation formed bottles of a polymeric material comprising a rinsing section adapted to rinse the interior of said bottles with water, a heating section to apply high frequency energy to the interior of the bottles, and a transporter arranged to convey the bottles from the rinsing section to the heating section and to turn such that all rinse liquid drips from the interior of the bottles without drying the bottles, wherein said plant has a supply of water containing a de-tensioning agent and an ultrasound applicator, both of which communicate with the rinsing section.

28. A plant for sterilizing the interior of hot deformation formed bottles of a polymeric material comprising a rinsing section adapted to rinse the interior of said bottles with water, a heating section to apply high frequency energy to the interior of the bottles, and a transporter arranged to convey the bottles from the rinsing section to the heating section and to turn such that all rinse liquid drips from the interior of the bottles without drying the bottles, wherein the transporter is arranged to turn the item such that a surface being sterilized is changed from an upward orientation to a downward orientation.

* * * * *